US008237549B2

(12) United States Patent
Horne

(10) Patent No.: US 8,237,549 B2
(45) Date of Patent: Aug. 7, 2012

(54) RFID PROTECTION SYSTEM, DEVICE, COMBINATION, AND RELATED METHODS

(75) Inventor: Gregory L Horne, Argyle, TX (US)

(73) Assignee: Curio Ltd., Fortworth, TX (US)

( * ) Notice: Subject to any disclaimer, the term of this patent is extended or adjusted under 35 U.S.C. 154(b) by 0 days.

(21) Appl. No.: 12/985,002

(22) Filed: Jan. 5, 2011

(65) Prior Publication Data

US 2011/0095868 A1 Apr. 28, 2011

Related U.S. Application Data

(62) Division of application No. 11/581,896, filed on Oct. 17, 2006, now Pat. No. 7,889,056.

(60) Provisional application No. 60/731,750, filed on Oct. 31, 2005.

(51) Int. Cl.
*H04Q 5/22* (2006.01)
(52) U.S. Cl. ........... 340/10.1; 340/568.7; 340/572.1; 340/572.3; 455/1; 455/41.1; 455/456.1; 455/421
(58) Field of Classification Search ............ 340/572.8, 340/10.1, 568.7, 572.1, 572.3, 5.2; 250/515.1; 455/1, 41.1, 229, 410, 421, 456.1–456.6
See application file for complete search history.

(56) References Cited

U.S. PATENT DOCUMENTS

| | | | |
|---|---|---|---|
| 4,631,708 A | 12/1986 | Wood et al. | |
| 4,931,788 A | 6/1990 | Creswick | |
| 5,083,111 A | 1/1992 | Drucker et al. | |
| 5,847,662 A | 12/1998 | Yokota et al. | |
| 6,121,544 A | 9/2000 | Petsinger | |
| 6,195,529 B1 | 2/2001 | Linz et al. | |
| 6,473,031 B1 | 10/2002 | Harris | |
| 6,580,432 B1 | 6/2003 | Leung et al. | |
| 6,687,506 B1 | 2/2004 | Girod | |
| 6,892,052 B2 | 5/2005 | Kotola et al. | |
| 6,925,287 B2 | 8/2005 | Davie et al. | |
| 6,970,070 B2 | 11/2005 | Juels et al. | |
| 6,978,146 B1 | 12/2005 | Yardman | |
| 7,075,437 B2 | 7/2006 | Bridgelall et al. | |
| 7,083,083 B2 | 8/2006 | Droz | |
| 7,088,248 B2 | 8/2006 | Forster | |
| 7,103,310 B2 | 9/2006 | Lucidarme et al. | |

(Continued)

OTHER PUBLICATIONS

International Search Report for co-pending PCT application PCT/US10/27845 dated May 27, 2010.

(Continued)

*Primary Examiner* — Albert Wong
*Assistant Examiner* — Ryan Sherwin
(74) *Attorney, Agent, or Firm* — Bracewell & Giuliani LLP

(57) ABSTRACT

Embodiments of systems, combinations, devices and methods of enhanced Radio Frequency Identification ("RFID") protection are provided. An embodiment of a combination of a separate RFID device and a separate RFID blocking device each adapted to be positioned separately into a container includes a separate RFID device adapted to be positioned in the container a separate RFID blocking device adapted to be positioned adjacent the separate RFID device and in the container so that when an unauthorized RFID interrogation device attempts to read the separate RFID device from within the container the separate RFID blocking device positioned adjacent the separate RFID device blocks the attempted read and so that when an authorized user desires to use the separate RFID device for an authorized read the authorized user selectively removes either the separate RFID device or the separate RFID blocking device and presents the separate RFID device for the authorized read.

12 Claims, 9 Drawing Sheets

U.S. PATENT DOCUMENTS

| | | |
|---|---|---|
| 7,221,900 B2 | 5/2007 | Reade et al. |
| 7,289,761 B2 | 10/2007 | Mazar |
| 7,298,243 B2 | 11/2007 | Juels et al. |
| 7,336,186 B2 | 2/2008 | Noguchi |
| 7,501,953 B2 * | 3/2009 | Diorio et al. ............... 340/572.4 |
| 7,522,905 B2 | 4/2009 | Hammad et al. |
| 7,671,741 B2 | 3/2010 | Lax et al. |
| 2003/0143943 A1 | 7/2003 | Kline |
| 2004/0222878 A1 | 11/2004 | Juels |
| 2004/0223481 A1 | 11/2004 | Juels et al. |
| 2005/0099268 A1 | 5/2005 | Juels et al. |
| 2005/0156711 A1 * | 7/2005 | Aljadeff et al. ............ 340/10.34 |
| 2006/0286938 A1 | 12/2006 | Murdoch |
| 2007/0289775 A1 | 12/2007 | Potts et al. |
| 2008/0256642 A1 | 10/2008 | Hachey |
| 2008/0303632 A1 | 12/2008 | Hammad |
| 2009/0021343 A1 | 1/2009 | Sinha |

OTHER PUBLICATIONS

File history for co-pending U.S. Appl. No. 12/406,744, filed on Mar. 18, 2009.

Wright, M., "Contact Traveling", Jul. 7, 2005, www.edn.com.

Zetter, K., "Jamming Tags Block RFID Scanners", Mar. 1, 2004, www.wired.com.

Notice of Allowability for co-pending U.S. Appl. No. 11/581,896.

Office Action in co-pending U.S. Appl. No. 12/406,744 dated Jun. 10, 2011.

International Preliminary Examination Report in co-pending application serial No. PCT/US10/27845 dated Aug. 17, 2011.

Notice of Allowance and Fees Due for U.S. Appl. No. 12/406,744, dated Dec. 7, 2011.

* cited by examiner

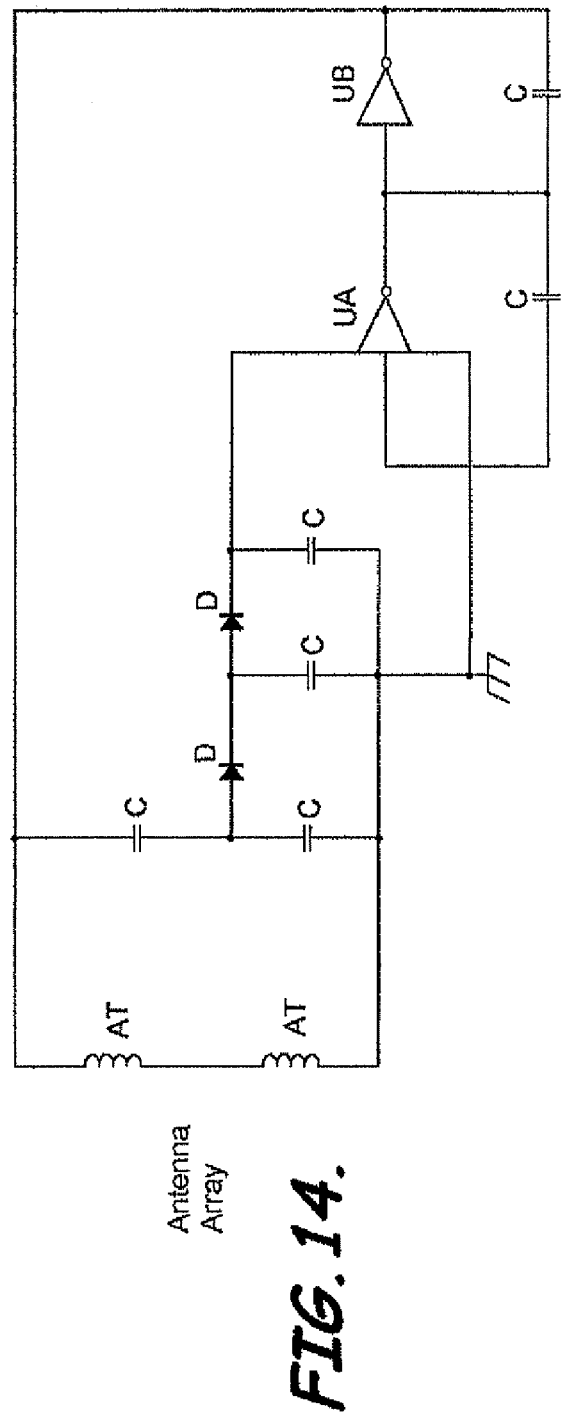

RFID PROTECTION SYSTEM, DEVICE, COMBINATION, AND RELATED METHODS

CROSS-REFERENCE TO RELATED APPLICATION

This is a divisional patent application of, and claims priority and the benefit of, U.S. Ser. No. 11/581,896, filed Oct. 17, 2006, titled "RFID Protection System, Device, Combination, and Related Methods," which claims priority and benefit to provisional patent U.S. Ser. No. 60/731,750, filed Oct. 31, 2005, titled "RFID Protection System, Device, Combination, and Related Methods," each incorporated herein by reference in its entirety.

BACKGROUND OF THE INVENTION

1. Field of the Invention

The present invention relates to the field of contactless circuitry and, more particularly, to Radio Frequency Identification ("RFID") devices and methods related to secure, confidential or proprietary data.

2. Description of Related Art

Theft of credit or debit card information and identification has become rampant worldwide. Governments, companies, and consumers spend millions of dollars each year to prevent and pursue such thefts.

Over the years, various types of identification technology have been used for credit or debit cards and for identification. These, for example, have included pin numbers, bar codes, and magnetic strips. More recently, however, steps have been taken to use RFID or other contactless chip technology in association with credit or debit cards, passports, documents, and other areas where identification, including portable and remote, are desired. An example of such applications of RFID can be seen in a recent news article titled "Contactless Traveling" by Wright (Electronic Design News (EDN) Jul. 7, 2005) for passport applications.

Nevertheless, the recent developments in technology still do not fully address potential security breaches of the RFID such as when an unauthorized RFID interrogation or reading device attempts to extract the RFID information, especially when a user or possessor of an RFID device is unsuspecting or not cognizant that the MD device is being interrogated.

Others have attempted solutions at blocking RFID devices to enhance privacy. Examples can be seen in U.S. Patent Application Publication No. 2004/0222878 A1 by Juels titled "Low-Complexity Cryptographic Techniques For Use With Radio Frequency Identification Devices", U.S. Patent Application Publication No. 2004/0223481 A1 by Juels, et al. titled "Method and Apparatus For Selective Blocking of Radio Frequency Identification Devices", and U.S. Patent Application Publication No. 2005/0099268 A1 by Juels, et al. titled "Radio Frequency Identification System With Privacy Policy Implementation Based on Device Classification". There are still needs, however, for enhanced, simple, flexible, and practical security and privacy protection for RFID and other contactless circuitry or chip devices.

SUMMARY OF THE INVENTION

In view of the foregoing, embodiments of the present invention beneficially provide systems, combinations, devices, and methods of enhanced RFID protection against unauthorized reading or interrogation of an RFID device. For example, Applicant has recognized that factors such as expense, size, practical and flexible use requirements for RFID and other contactless chip technology create problems and barriers for widespread use in many applications. Embodiment of systems, combinations, devices, and methods advantageously allow users of RFID devices increased flexibility with little or no increase in expense or size and yet effectively block unauthorized access to RFID information associated with a device.

More particularly, an embodiment of the present invention provides a combination of a separate radio frequency identification (RFID) device and a separate RFID blocking device each adapted to be positioned separately into a container. The combination includes a separate RFID device adapted to be positioned in the container and a separate RFID blocking device adapted to be positioned adjacent the separate RFID device and in the container so that when an unauthorized RFID interrogation device attempts to read the separate RFID device from within the container the separate RFID blocking device positioned adjacent the separate RFID device blocks the attempted read and so that when an authorized user desires to use the separate RFID device for an authorized read the authorized user selectively removes either the separate RFID device or the separate RFID blocking device and presents the separate RFID device for the authorized read.

An embodiment of a device for blocking unauthorized RFID interrogation when the device is positioned adjacent a separate RFID device includes an incoming signal detector to detect an incoming signal in an attempt to interrogate the separate RFID device and an RFID signal disruptor responsive to the detection of the incoming interrogation signal to respond to the incoming interrogation signal with disruptive read signals.

Another embodiment of a device for blocking unauthorized RFID interrogation when the device is positioned adjacent a separate RFID device includes an incoming signal detector to detect incoming RFID interrogation signals; and an RFID interferer responsive to the incoming signal detector to interfere with activation of operation ability of the separate RFID device.

Embodiments of methods of enhancing protection against unauthorized interrogation of an RFID or other contactless circuitry device are also provided according to the present invention. An embodiment of a method includes positioning a separate RFID blocking device adjacent a separate RFID device to block RFID interrogation and selectively separating the separate RFID device from the separate RFID blocking device for authorized interrogation of the separate RFID device. Another embodiment of method of enhanced protection against unauthorized interrogation of a contactless circuiting device includes positioning a separate contactless circuitry blocking device in association with a container and adjacent a separate contactless circuitry device to thereby block unauthorized interrogation of the separate contactless circuitry device and selectively separating the separate contactless circuitry device from being adjacent the separate contactless circuitry block device for authorized interrogation of the separate contactless circuitry device.

By providing user separable RFID or other contactless circuitry blocking devices and RFID or other contactless circuitry devices, embodiments of systems, combinations, devices and methods of the present invention provide flexibility, portability and user controlled protection for a user's RFID or other contactless circuitry device.

BRIEF DESCRIPTION OF THE DRAWINGS

Some of the features and benefits of the present invention having been stated, others will become apparent as the description proceeds when taken in conjunction with the accompanying drawings, in which:

FIG. 13 is a schematic diagram of a portion of an RFID blocking circuit of an RFID blocking device according to an embodiment of the present invention; and FIG. 14 is a schematic diagram of a portion of an REID blocking circuit of an RFID blocking device according to another embodiment of the present invention.

DETAILED DESCRIPTION

The present invention now will be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

FIGS. 1, 6 and 8-9 illustrate embodiments of a combination of a separate radio frequency identification (RFID) device 30 and a separate RFID blocking device 40 each adapted to be positioned separately into or to be associated with a container 50. The combination includes a separate RFID device 30 adapted to be positioned in the container 50 and a separate RFID blocking device 40 adapted to be positioned adjacent the separate RFID device and in the container. When an unauthorized RFID interrogation, reading or scanning device ("interrogation device") S attempts to read the separate RFID device 30 from within the container 50, the separate RFID blocking device 40 positioned adjacent the separate RFID device 30 blocks the attempted interrogation or read. When an authorized user U desires to use the separate RFID device 30 for an authorized read, such as an authorized interrogation device S; the authorized user U can selectively remove either the separate RFID device 30 or the separate RFID blocking device 40 and present the separate RFID device 30 (within or outside of the container) for the authorized read.

A container, for example, can be selected from the group of: a wallet, a passport, a purse, a folder, a pocket, an envelope, a card holder, a sleeve, and a display mount. The container 50 can also include other items therein such as other credit or debit cards 54, money, jewelry, paper or sheets as well understood by those skilled in the art. A container is illustrated herein as a separate holder for credit or debit cards and a passport and clip or tag for a page in a page in a passport. As understood by those skilled in the art, however, numerous other types of containers or configurations in association with a container, e.g., readily removable clip or tag for a credit or debit card, can be used as well according to the present invention.

Figure 11:
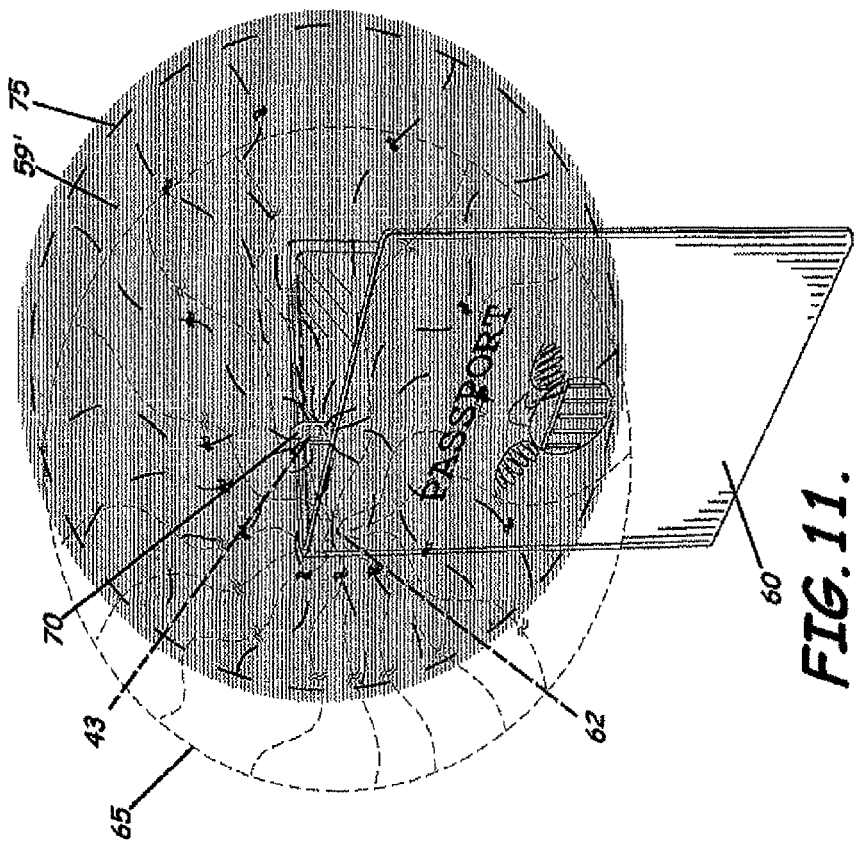
FIG. 11 is a schematic view of a combination of separate RFID device and a separate RFID blocking device positioned in a container according to yet another embodiment of the present invention.
Figure 10:
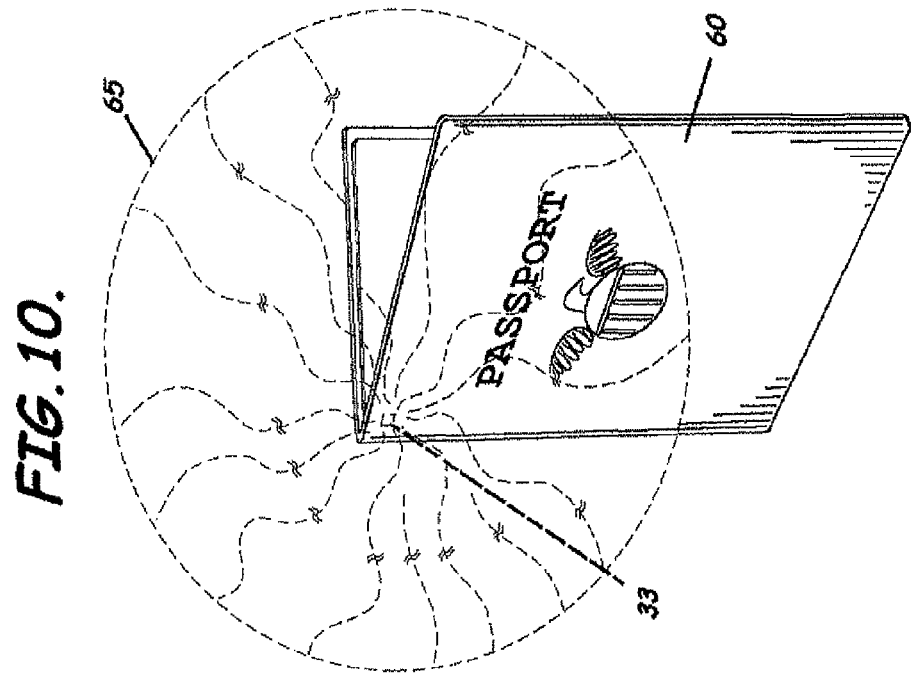
FIG. 10 is a schematic view of an RFID device positioned in another embodiment of a container.

An RFID device 30, for example, can be a credit card, a debit card, other transaction card (e.g. telephone, gift, electronic, smart) a passport, a passport cover or page, a drivers license, or other device containing an RFID circuit or chip 33 as understood by those skilled in the art. FIGS. 1-9 illustrate credit or debit cards as RFID devices 30, and FIGS. 10-11 illustrate passports as RFID devices 60. These are only for illustrative purposes and many other types of devices having RFID associated therewith can be used as well according to the present invention.

An embodiment of a separate RFID blocking device 40, for example, likewise can be a credit or debit card or other transaction card, tag, clip, sheet, or other device (see, e.g., FIGS. 6, 12, 13, and 14) that also has circuitry or a chip 43, operating as a signal interferer as understood by those skilled in the art, that includes an incoming signal detector, such as provided by receive and demodulate 100, 102 as understood by those skilled in the art, to detect incoming signals from the unauthorized RFID interrogation device S and an RFID signal disruptor, such as provided by signal mixer and frequency generation module 90 as understood by those skilled in the art, responsive to the incoming signal detector to respond to the interrogation device S with disrupting read signals. An embodiment of an RFID blocking device 40, for example, further can include an incoming signal demodulator, such as provided by receive and demodulate 100, 102 as understood by those skilled in the art, to demodulate a detected incoming signal, and the disruptor, such as provided by signal mixer and frequency generation module 90 as understood by those skilled in the art, can include an RFID signal generator to generate an RFID signal at the same data rate as the demodulated signal to thereby disrupt the RFID device's ability to communicate with the unauthorized interrogation device S.

Another embodiment of a separate RFID blocking device includes an incoming signal detector to detect incoming signals from the unauthorized RFID interrogation device S and an RFID interferer responsive to the incoming signal detector to interfere with activation of operation ability of the separate RFID device 30 so that the interrogation device S cannot properly read or have access to information on the RFID device. For example, a separate RFID device 30 can include an anti-collision protocol, and the RFID interferer can interfere with the separate RFID device 30 so that the anti-collision protocol fails to activate.

Alternatively, for example, a separate RFID device 30 can include an anti-collision protocol, and the RFID interferer interferes with a product of the anti-collision protocol of the separate RFID device 30 when being transmitted to the unauthorized RFID interrogation device S. An RFID interferer, for example, can include a frequency shift generator, such as provided by signal mixer and frequency generation module 90 as understood by those skilled in the art, to generate a frequency shift above and below a center frequency of an RFID communication link to the separate RFID device 30.

Figure 1:
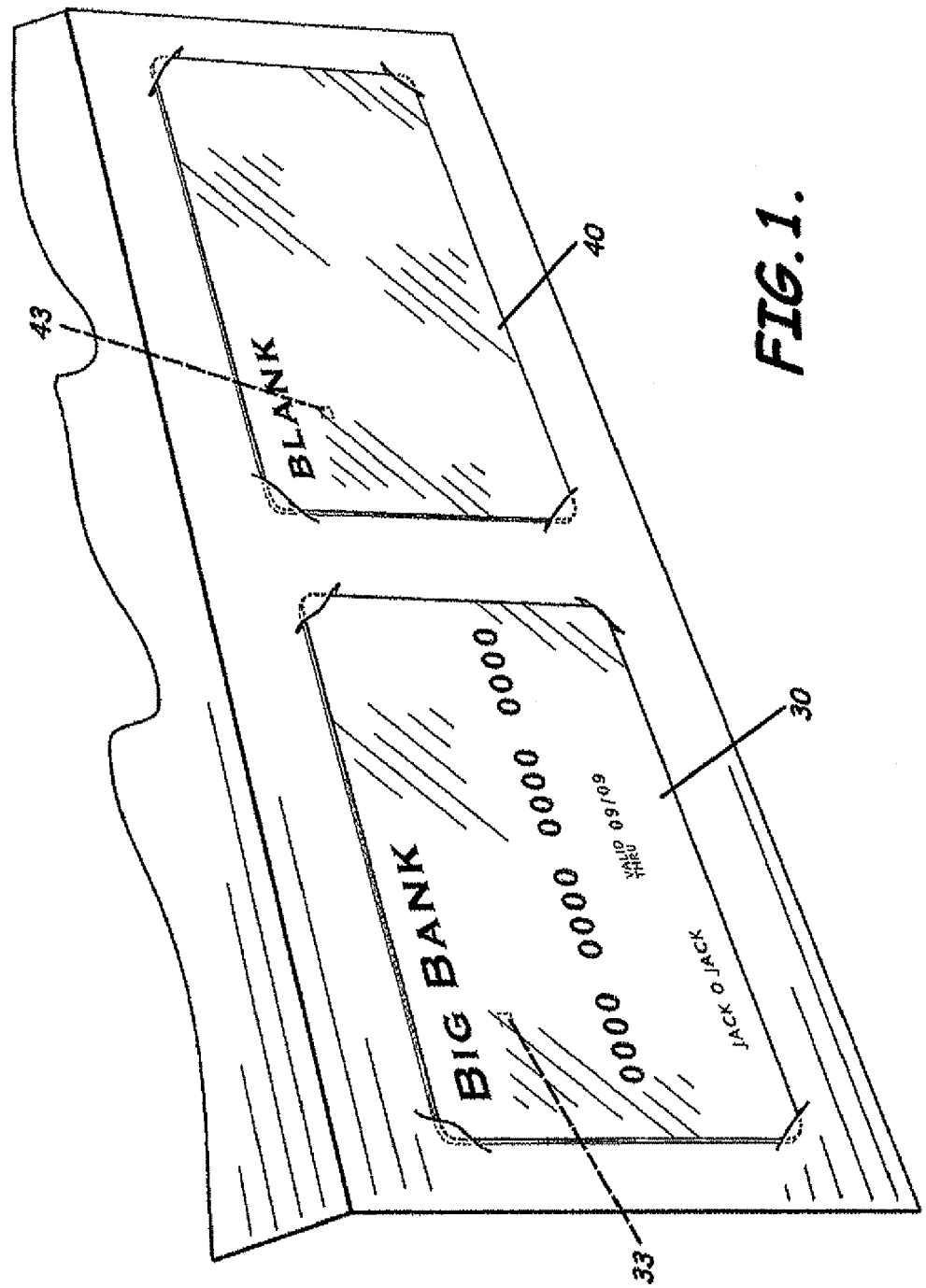
FIG. 1 is a perspective view of a combination of a separate RFID device and a separate RFID blocking device positioned in a container according to an embodiment of the present invention.
Figure 2:
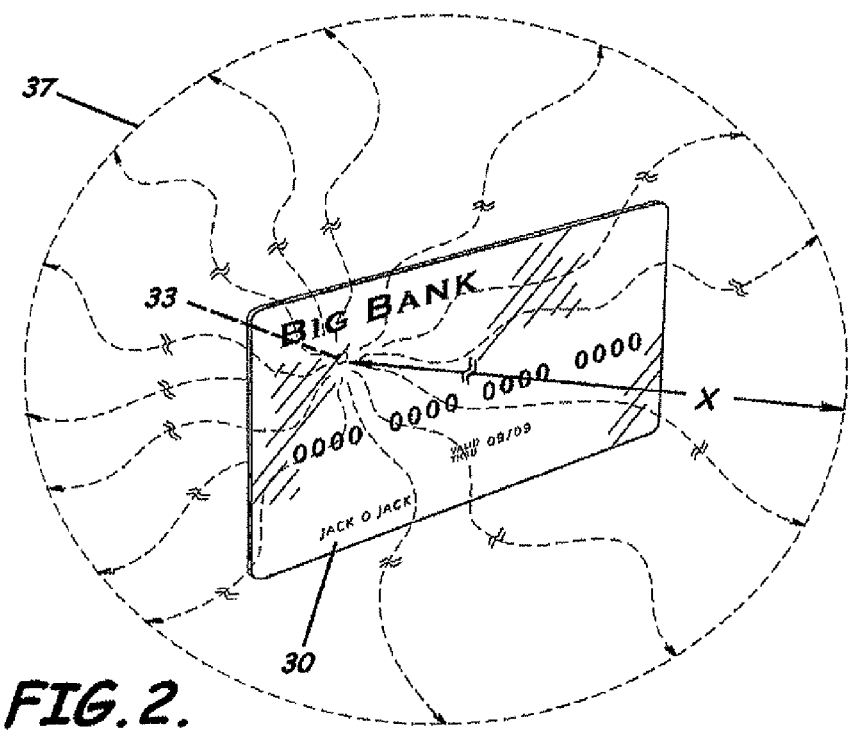
FIG. 2 is a schematic environmental view of a separate RFID device being interrogated by an RFID interrogation device.
Figure 3:
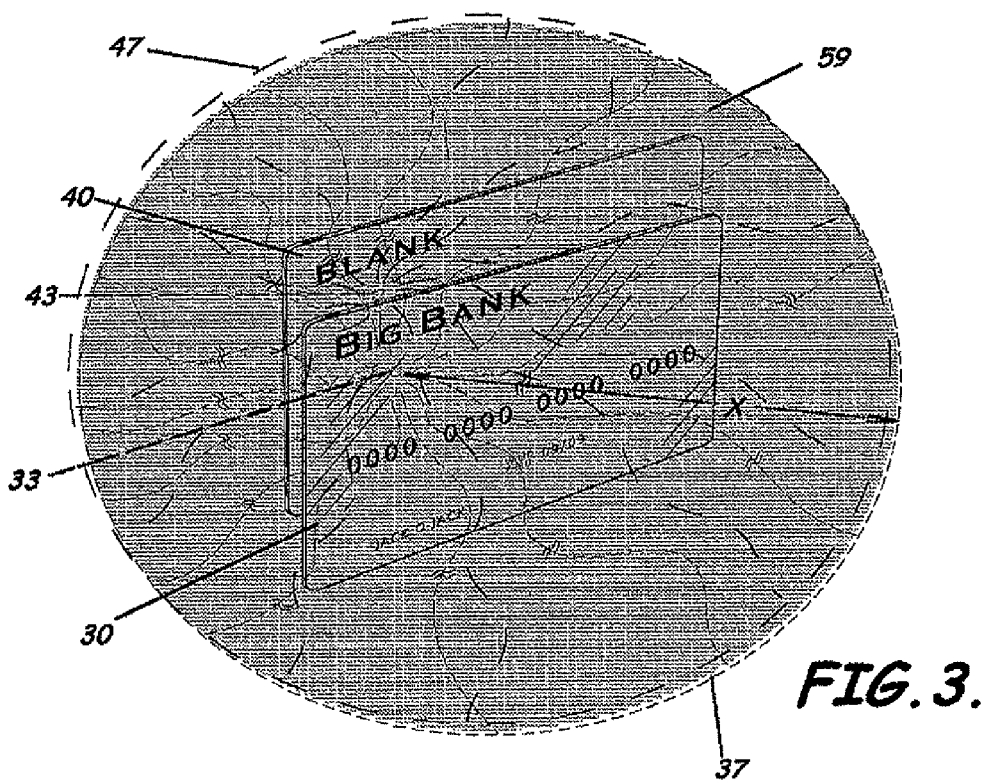
FIG. 3 is a schematic environment view of a combination of a separate RFID device and a separate RFID blocking device adapted to be positioned in a container according to an embodiment of the present invention.
Figure 4:
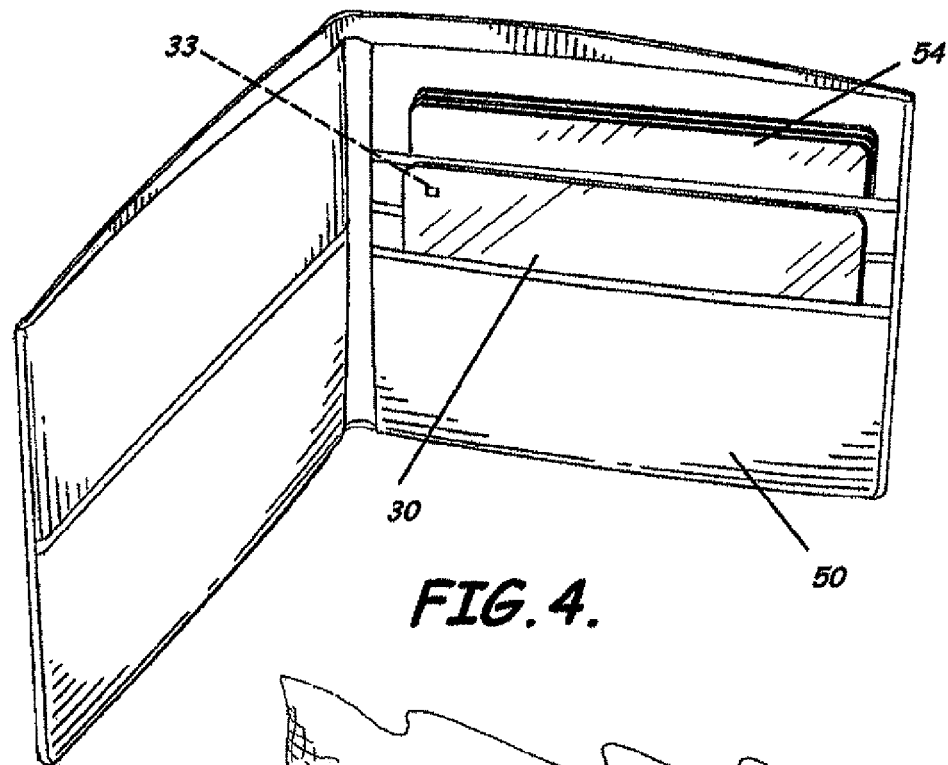
FIG. 4 is a perspective view of an RFID device positioned in a container.
Figure 5:
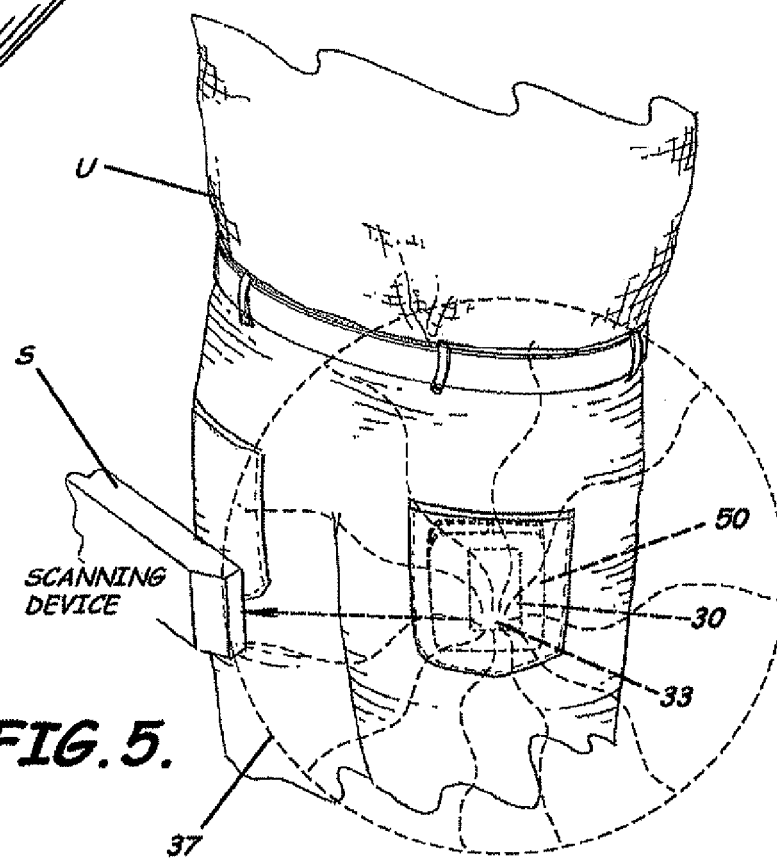
FIG. 5 is a perspective view of an RFID device positioned in a container, positioned in a pocket of a user, and being interrogated by an interrogation device.
Figure 6:
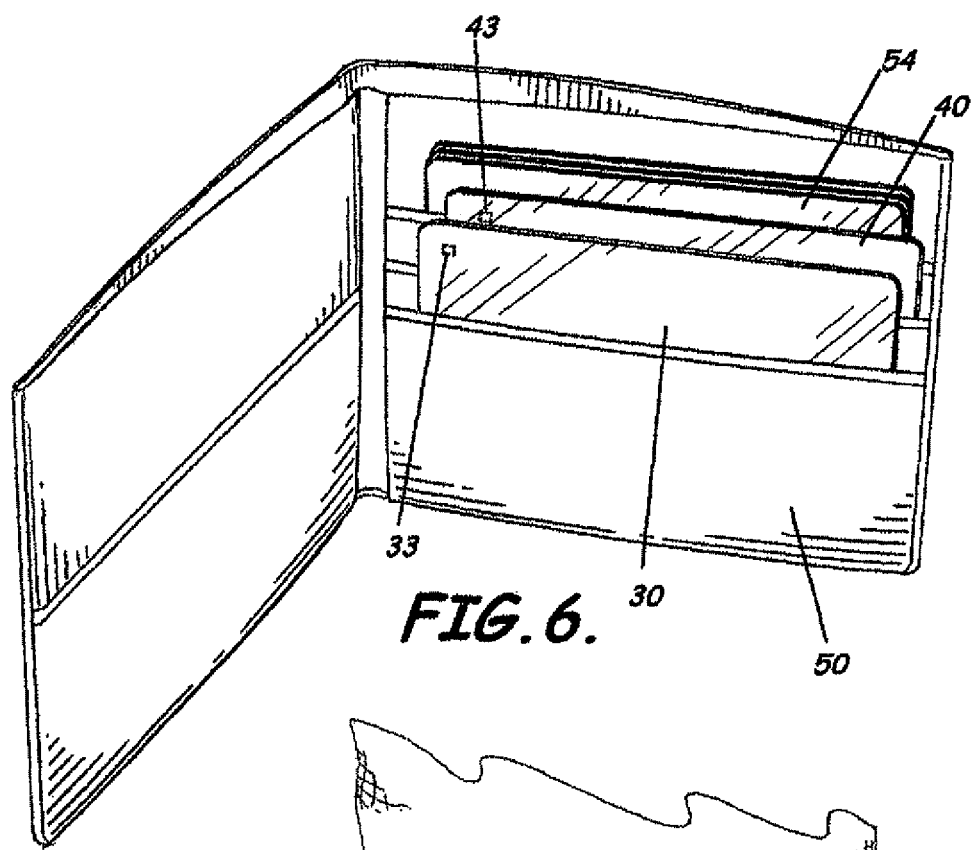
FIG. 6 is a perspective view of a combination of a separate RFID deice and a separate RFID blocking device positioned in a container according to another embodiment of the present invention.
Figure 7:
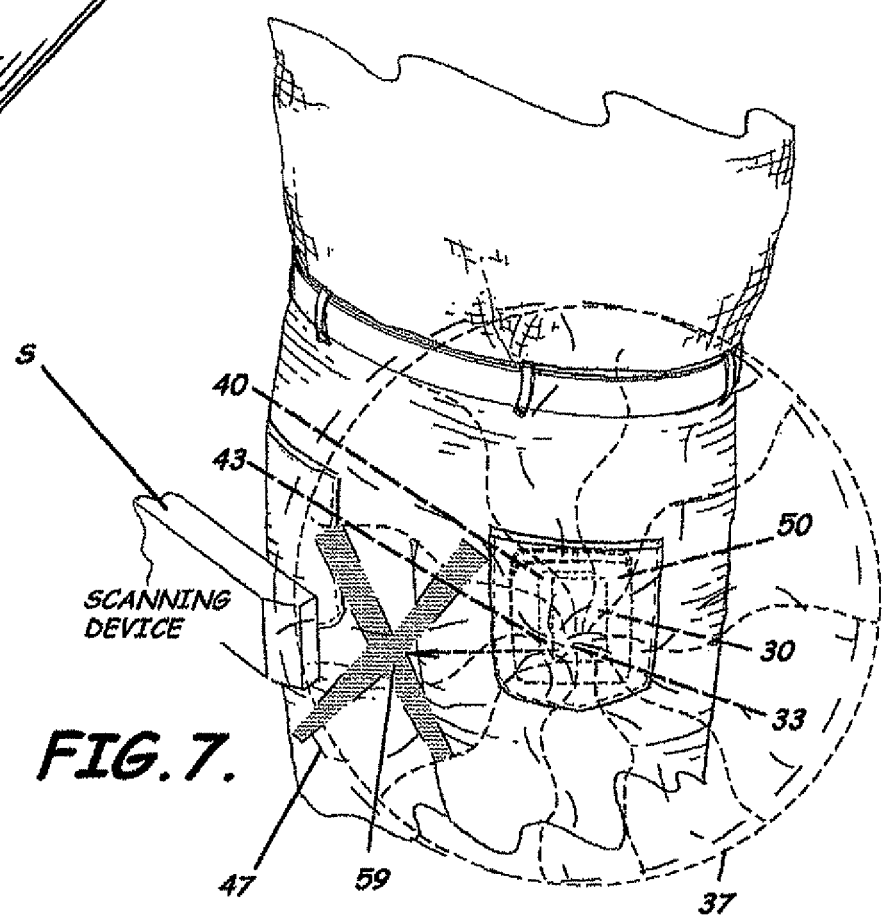
FIG. 7 is an environmental view of the combination of a separate RFID device and a separate RFID blocking device positioned in a container as illustrated in FIG. 4, positioned in a pocket of an authorized user, and being interrogated by an unauthorized user with an RFID interrogation device according to an embodiment of the present invention.
Figure 8:
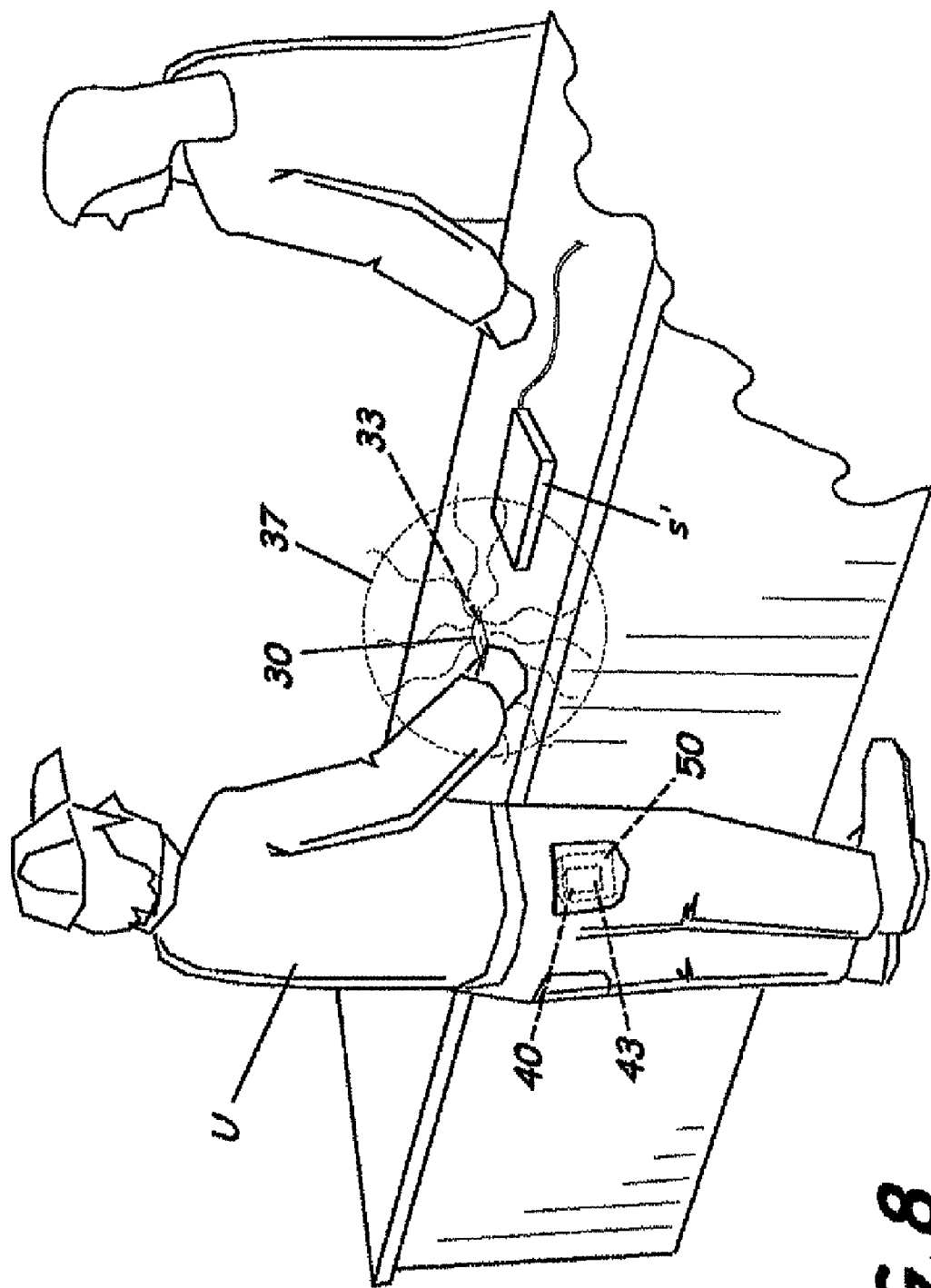
FIG. 8 is an environmental view of an authorized user using a separate RFID device for an authorized RFID read after selective removal of the same from a container having a combination of a separate RFID and a separate RFID blocking device positioned therein according to an embodiment of the present invention.
Figure 9:
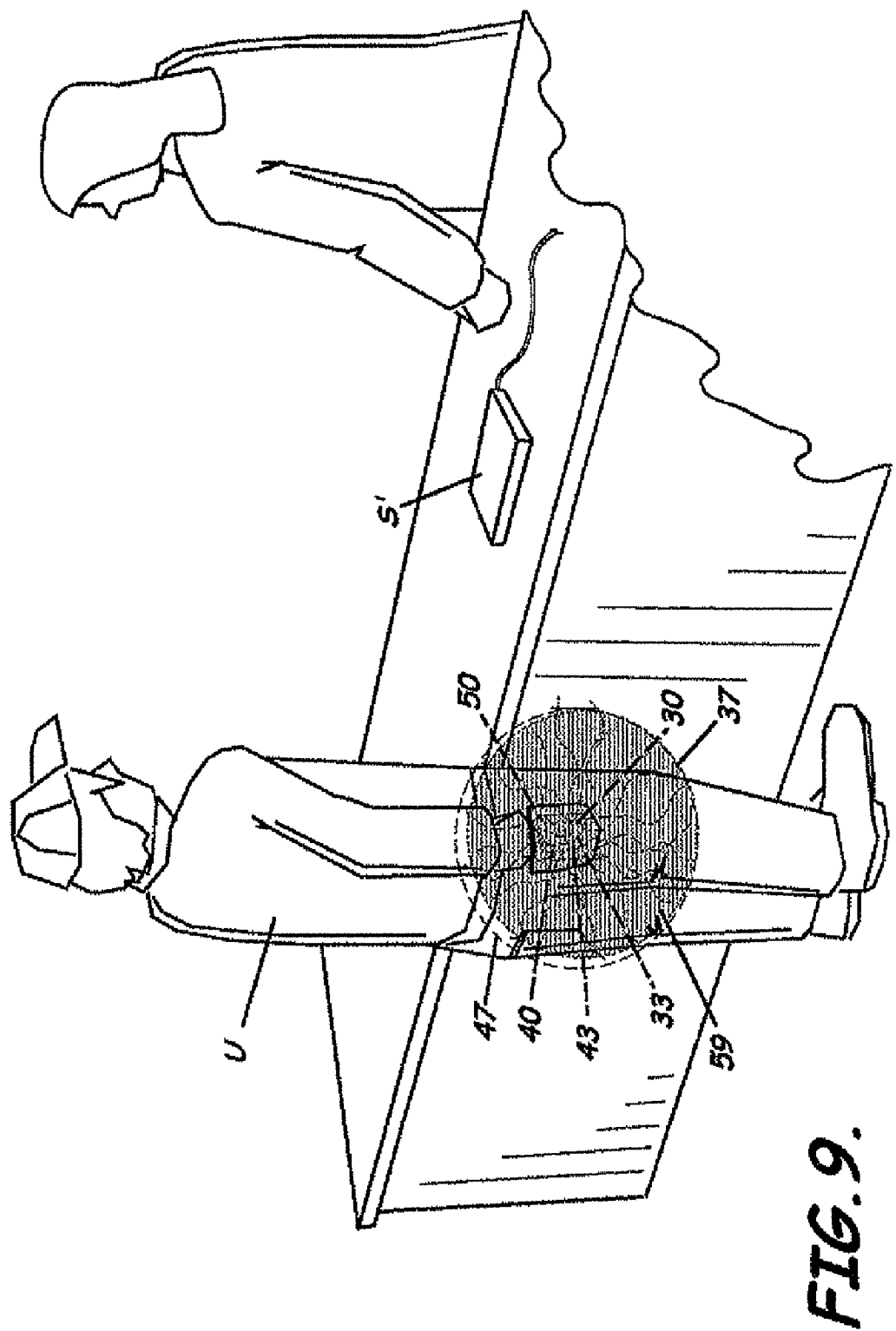
FIG. 9 is an environmental view of a separate REID device being returned to a container so that the container has a combination of a separate RFID device and a separate RFID blocking device according to an embodiment of the present invention.

For example, as shown in FIGS. 2-3, an RFID interrogation device S can be positioned separate and spaced-apart from an RFID device 30 a selected distance X and an interrogation response field 37 from the RFID device 40 is generated by the RFID device 30 in response to the interrogation. Then, for example, a second field 47 can also be generated by the RFID blocking device 40 in response to the same interrogation to thereby generate a blocking zone 59 such as by disrupting the interrogation signals, interfering with the transmitting signal from the RFID device 30, or other blocking techniques understood by those skilled in the art.

Likewise, as shown in FIGS. 10-11, an RFID device 60 such as in the form of a passport or passport cover can have RFID or other contactless circuitry or chip 33, 62 associated therewith and can generate an RF field 65 responsive to interrogation. An RFID or other contactless circuitry blocking device 70, such as in the form of a tag, clip, or page marker also having the RFID or other contactless blocking circuitry or chip 43, can be attached to the passport 60, such as one of the pages thereof, to generate an RF blocking field 75 or blocking zone 59 such as described previously.

Figure 12:
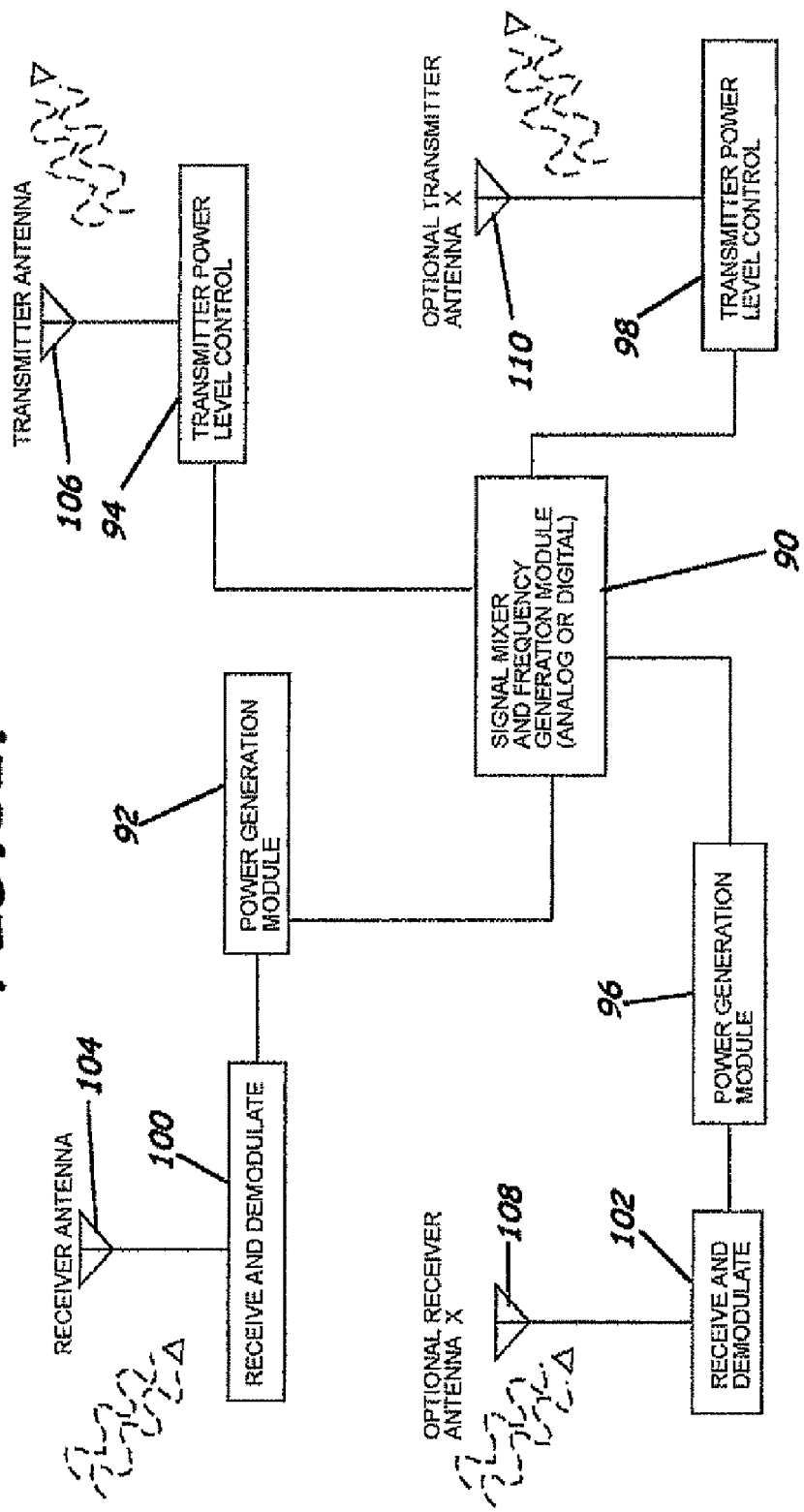
FIG. 12 is a schematic block diagram of an RFID blocking device according to an embodiment of the present invention.

An example of RFID blocking circuitry for RFID blocking devices 40, 70 is shown in FIG. 12 and, as understood by those skilled in the art, can include one or more receiver antennas 104, 108 to assist in receiving RFID interrogation signals, a receiver and demodulator 100, 102 to demodulate a received interrogation signal, a power generator module 92, 96 to generate power for the RFID blocking circuitry responsive to the received interrogation signal, and a signal mixer and frequency generation module (analog or digital) 90 to mix received signals and generate a frequency signal as understood by those skilled in the art. The circuitry can also include, for example, a transmitter power level controller 94, 98 and one or more transmitter antennas 106, 110 to assist with the transmission of the blocking RF fields or zones. As understood by those skilled in the art, FIGS. 13-14 illustrate two examples of more detailed antenna arrays (or inductors), capacitors, diodes, and amplifiers arranged in circuitry as understood by those skilled in the art to accomplish RFID blocking. For example, as understood by those skilled in the art, an application specific integrated circuited (ASIC) can be used to interface and respond to an antenna array in a low power design such as shown in FIG. 13, the low power ASIC can have digital sampling to detect incoming signals from the interrogation device S, then use various signal generation or frequency generation techniques as understood by those skilled in the art to respond with disruptive patterns.

For example, as understood by those skilled in the art, RFID circuitry or chips often have an anti-collision protocol or program that allow multiple chips to talk to a single interrogation device S. This technique can generate an interference with the RFID's ability to activate anti-collision protocol(s). Depending on the desires of the designer of the RFID blocking circuitry, the anti-collision protocol(s) can be stopped before activation, the product or result of the protocol can be attacked or interfaced with during generation or transmission, or both. A frequency shift generation, for example, above and/or below a center frequency of an RFID communication link can be produced by the blocking circuitry.

Alternatively, such as shown in FIG. 14, an analog or discrete design can demodulate the incoming signal from the interrogation devices, and then broadcast back out at that data rate to suppress the ability of the RFID device 30, 60 (or circuitry 33, 62) to communicate. As understood by those skilled in the art, these are only a few effective examples according to embodiments of systems, combinations, devices and methods of the present invention, other examples and techniques according to the present invention will be apparent to those skilled in the art.

As illustrated in FIGS. 1-14, embodiments of the present invention also include methods of enhancing protection against unauthorized access to RFID or other contactless chip devices. For example, an embodiment of a method of enhancing protection against unauthorized interrogation of an RFID device 30 includes positioning a separate RFID blocking device 40 adjacent a separate RFID device 30 to block RFID interrogation and selectively separating the separate RFID device 30 from the separate RFID blocking device 40 for authorized interrogation of the separate RFID device 30. The positioning, for example, can include either the separate RFID blocking device 40, 70 or the separate RFID device 30, 60 being in a container 50, 60 prior to positioning the separate RFID blocking device 40, 70 adjacent the separate RFID device 30, 60. The blocked RFID interrogation includes an unauthorized RFID interrogation, and the container, for example, can be selected from the group of: a wallet, a passport, a purse, a folder, a pocket, an envelope, a sleeve, a card holder, and a display mount. The blocking of the RFID interrogation, for example, interferes with the activation of an anti-collision protocol associated with the separate RFID device or interferes with the transmission of an anti-collision protocol associated with the separate MD device or alternatively, for example, the blocking of the RFID interrogation can include providing disrupting read signals responsive to an attempted interrogation of the separate RFID device.

Another embodiment of a method of enhanced protection against unauthorized interrogation of a contactless circuiting device includes positioning a separate contactless circuitry blocking device in association with a container and adjacent a separate contactless circuitry device to thereby block unauthorized interrogation of the separate contactless circuitry device and selectively separating the separate contactless circuitry device from being adjacent the separate contactless circuitry block device for authorized interrogation of the separate contactless circuitry device. Contactless circuitry of the separate contactless circuitry device, for example, can be selected from the group of: RFID, Infrared, Bluetooth, WI-FI, radio frequency microwave frequency, cellular frequency, global positioning system and optical.

Many modifications and other embodiments of the invention will come to the mind of one skilled in the art having the benefit of the teachings presented in the foregoing descriptions and the associated drawings. Therefore, it is to be understood that the invention is not to be limited to the illustrated That claimed is:

1. A combination of a separate radio frequency identification (RFID) device and a separate RFID blocking device, each being adapted to be positioned separately into a container so that the separate RFID device and the separate RFID blocking device are each adjacent the other, the combination comprising:
   a separate RFID device adapted to be positioned in a container; and
   a separate RFID blocking device adapted to be positioned in the container adjacent the separate RFID device to detect and block an attempted read of the otherwise separate RFID device from the container when an RFID interrogation device is positioned to read the separate RFID device from the container, the separate RFID blocking device being positioned to operatively receive power from the RFID interrogation device during an attempted read of the separate RFID device and including an incoming signal demodulator to demodulate an incoming signal and an RFID signal disruptor positioned to produce disrupting signals responsive to the attempted read of the separate RFID device by the RFID interrogation device, the RFID signal disruptor including an RFID signal generator to generate an RFID signal at the same data rate as the demodulated signal and a signal mixer and frequency generation module, the signal mixer and frequency generation module combining the incoming signal with the RFID signal generated at substantially the same data rate as the demodulated incoming signal to thereby form the disrupting signals in a blocking zone extending adjacent the separate RFID device, the blocking zone being defined as a region of disrupting signals being generated from the separate RFID blocking device when positioned adjacent the separate RFID device so that the disrupting signals disrupt the ability of the separate RFID device to receive an interrogation signal from the RFID interrogation device when the RFID interrogation device is positioned to read the separate RFID device from the container, the separate RFID blocking device further being adapted to be positioned separate and spaced apart from the separate RFID device to thereby allow an attempted read of the separate RFID device by the RFID interrogation device when the separate RFID device is no longer positioned adjacent the separate RFID blocking device.

2. A combination as defined in claim 1, wherein the separate RFID blocking device includes an incoming signal detector to detect initial incoming signals from the RFID interrogation device, and wherein the RFID signal disruptor is responsive to the initial incoming signals being detected.

3. A combination as defined in claim 1, wherein the container is selected from the group of: a wallet, a passport, a purse, a folder, a pocket, an envelope, a card holder, a sleeve, and a display mount.

4. A radio frequency identification (RFID) blocking device to block RFID interrogation when the device is positioned adjacent a separate RFID device, the RFID blocking device comprising:
   an incoming signal detector to detect an initial incoming signal in an attempt to interrogate the separate RFID device;
   a demodulator responsive to the incoming signal detector to demodulate a detected incoming signal; and
   an RFID signal disruptor responsive to the detection of the initial incoming signal to produce disrupting signals that form a blocking zone extending adjacent the separate RFID device, the blocking zone being defined as a region of disrupting signals being generated from the RFID blocking device so that the disrupting signals disrupt with the ability of the separate RFID device to receive the initial incoming signals when positioned adjacent the separate RFID blocking device, the RFID signal disruptor including an RFID signal generator to generate a signal at substantially the same data rate as the demodulated signal and a signal mixer and frequency generation module, the signal mixer and frequency generation module combining the incoming signal with the signal generated at substantially the same data rate as the demodulated incoming signal to thereby form the disrupting signals that disrupt the separate RFID device's ability to receive the interrogation signal from the interrogation device.

5. A contactless circuitry blocking device to block interrogation when the contactless circuitry blocking device is positioned adjacent a separate contactless circuitry device, the contactless circuitry blocking device comprising:
   an incoming signal detector to detect an initial incoming signal in an attempt to interrogate the separate contactless circuitry device; and
   a signal disruptor responsive to the detection of the initial incoming signal to produce disrupting signals that form a blocking zone extending adjacent the separate contactless circuitry device, the blocking zone being defined as a region of disrupting signals being generated from the contactless circuitry blocking device so that the disrupting signals disrupt with the ability of the separate contactless circuitry device to receive the initial incoming signals when positioned adjacent the contactless circuitry blocking device, the RFID signal disruptor including an RFID signal generator to generate a signal at substantially the same data rate as the initial incoming signal and a signal mixer and frequency generation module to combine the incoming signal with the signal generated at substantially the same data rate as the incoming signal to thereby form the disrupting signals that disrupt the separate RFID device's ability to receive the interrogation signal from the interrogation device.

6. A contactless circuitry blocking device as defined in claim 5, further comprising a demodulator responsive to the incoming signal detector to demodulate a detected incoming signal, and wherein the signal disruptor includes a signal generator to generate a signal at the same data rate as the demodulated signal to thereby disrupt the separate contactless circuitry device's ability to receive the incoming signal.

7. A contactless circuitry blocking device as defined in claim 5, wherein the contactless circuitry of the separate contactless circuitry device is selected from the group of:
   RFID, Infrared, Bluetooth, WI-FI, radio frequency microwave frequency, cellular frequency, global positioning system and optical.

8. A method of enhancing protection against unauthorized interrogation of an RFID device, the method comprising:
   positioning a separate RFID blocking device adjacent a separate RFID device;
   demodulating an incoming signal to the RFID blocking device when the incoming signal is received from a RFID interrogation device;
   generating from the RFID blocking device a signal at substantially the same data rate as the demodulated signal;

combining from the RFID blocking device the signal generated at substantially the same data rate with the incoming signal to thereby form one or more disrupting signals to block RFID interrogation during an attempt to interrogate the separate RFID device so that the separate RFID blocking device produces the one or more disrupting signals that form a blocking zone extending adjacent the separate RFID device responsive to the attempted read of the separate RFID device signals by an RFID interrogation device so that the disrupting signals disrupt the ability of the separate RFID device to receive an attempted read from a RFID interrogation device when the RFID interrogation device is positioned to read the separate RFID device and the separate RFID blocking device is positioned adjacent the separate RFID device; and selectively separating the separate RFID device from being positioned adjacent the separate RFID blocking device for authorized interrogation of the separate RFID device.

9. A method as defined in claim 8, wherein the positioning includes either the separate RFID blocking device or the separate RFID device being in a container prior to positioning the separate RFID blocking device adjacent the separate RFID device.

10. A method as defined in claim 8, wherein the blocked RFID interrogation includes an unauthorized RFID interrogation, and wherein the container is selected from the group of: a wallet, a passport, a purse, a folder, a pocket, an envelope, a sleeve, a card holder, and a display mount.

11. A method of enhanced protection against unauthorized interrogation of a contactless circuiting device, the method comprising:

positioning a separate contactless circuitry blocking device in association with a container and adjacent a separate contactless circuitry device;

detecting an incoming signal to the separate contactless blocking device from a contactless circuitry interrogation device;

generating from the separate contactless blocking device a signal at substantially the same data rate as the incoming signal;

combining the signal generated at substantially the same data rate with the incoming signal to thereby form one or more disrupting signals to thereby block unauthorized interrogation of the separate contactless circuitry device so that the separate contactless circuitry blocking device produces the one or more disrupting signals that form a blocking zone extending adjacent the separate contactless circuitry device responsive to the unauthorized interrogation of the separate contactless circuitry device by an contactless circuitry interrogation device so that the disrupting signals disrupt the ability of the separate contactless circuitry device to receive an attempted read from the contactless circuitry interrogation device when the contactless circuitry interrogation device is positioned to interrogate the separate contactless circuitry device and the separate contactless circuitry blocking device is positioned adjacent the separate contactless circuitry blocking device; and selectively separating the separate contactless circuitry device from being adjacent the separate contactless circuitry blocking device for authorized interrogation of the separate contactless circuitry device.

12. A method as defined in claim 11, wherein contactless circuitry of the separate contactless circuitry device is selected from the group of: RFID, Infrared, Bluetooth, WI-FI, radio frequency microwave frequency, cellular frequency, global positioning system and optical.

\* \* \* \* \*